Feb. 12, 1957  R. C. KALEY  2,781,067
SAFETY DEVICE FOR ROTARY CUTTERS
Filed Sept. 22, 1954

INVENTOR
ROBERT C. KALEY
BY Bradley Cohn
ATTORNEY

2,781,067

SAFETY DEVICE FOR ROTARY CUTTERS

Robert C. Kaley, Landisville, Pa., assignor to De Walt Inc., a corporation of Pennsylvania Application September 22, 1954, Serial No. 457,587

7 Claims. (Cl. 143—159)

This invention relates to cutting machines having power driven rotary saws or other cutters, and more particularly to a protective guard or shield mounted about the cutter for safety purposes. The conventional form of these machines consists of a circular or disc saw mounted on a rotating arbor. The saw generally is moved across the workpiece although the saw may be held stationary and the workpiece moved relative thereto. Also, I employ the term saw disc to include other forms of rotary cutters for special operations such as dadoing, shaping, molding and the like.

These machines are usually provided with an arcuate guard enclosing the upper and mid-portion of the periphery of the cutter to prevent the operator inadvertently contacting the cutter. It is an object of my invention to provide a means that will cover the entire periphery of the saw and yet permit intentional contact of the workpiece with the saw. With my invention, accidental contact with the cutting tool from the side even adjacent the bottom is prevented.

It is a further object of my invention to provide two flat rings liftably mounted adjacent the periphery of the saw. I have found it convenient to mount these rings on a conventional arcuate guide.

Figure 1:
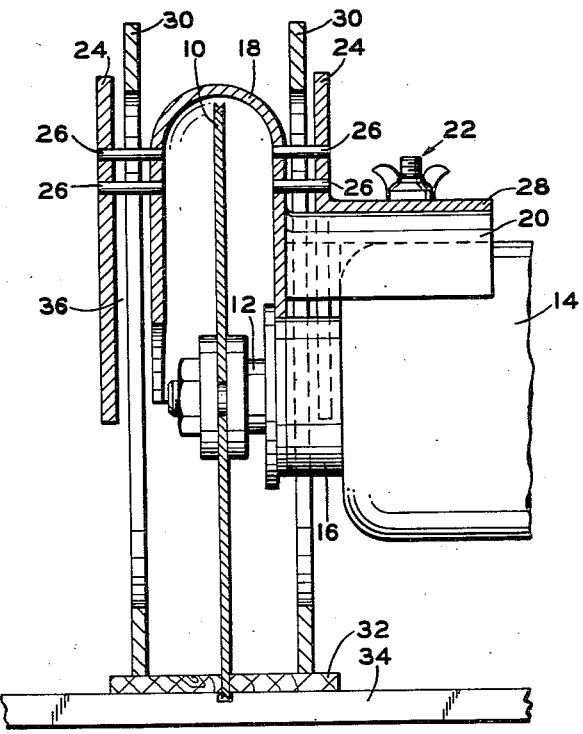
Figure 2:
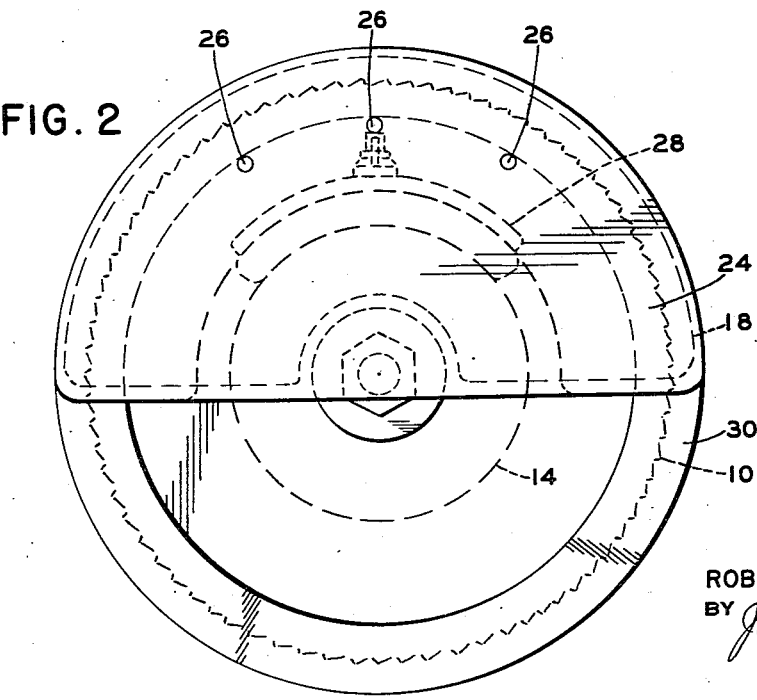

The novel features which I believe to be characteristic of my invention are set forth with particularity in the appended claims. My invention itself, however, both as to its organization and method of operation may be understood by reference to the apparatus embodying my invention and shown in the accompanying drawing in which:

Fig. 1 is a partially sectional elevation showing my novel guard riding over a workpiece in conjunction with a woodworking machine, and Fig. 2 is an end elevation of the same, but shown in normal resting position absent a workpiece.

Referring now to Fig. 1, the saw blade 10 is shown secured to the rotating shaft 12 projecting from motor housing 14. The motor housing 14 is provided with a cylindrical-shaped guard seat 16 supporting the arcuate guard 18. Guard 18 has a curved mounting bracket 20 slidingly engaging the top of motor housing 14. A wing nut and bolt 22 engages a slot (not shown) of mounting bracket 20 to secure guard 18 to motor housing 14. Guard 18 may be rocked to a limited extent about and concentric to the blade 10 by adjustment of the wing nut 22 in the slot (not shown) of mounting bracket 20. Semi-circular guide plates 24 are each secured to and spaced from guide 18 by three spacer pins 26. The rear (right hand Fig. 1) guide plate 24 has an integral flange 28 engaged by the wing nut and bolt 22.

In this embodiment, I have found it unnecessary to elongate the opening in the flange 28 at its engagement with the wing nut and bolt 22 and accordingly the conventional elongated slot (not shown) in mounting bracket 20 is unnecessary although it may be employed if desired. The rings 30 have an outside diameter greater than that of the saw blade 10 and an inside diameter less than the diameter of the saw blade 10 so as to shield the cutting edge. Rings 30 hang loosely on pins 26 and are guided in the channel 36 formed between the semi-circular guide plates 24 and the guard 18. Pins 26 are positioned along a curve concentric with blade 10 and at a radius approximating the inside radius of rings 30. As shown in Fig. 1, the saw blade 10 is cutting through a workpiece 32 lying on the worktable 34. Rings 10 are shown lifted by the workpiece 32 so they are substantially out of contact with the pins 36 although in actual practice they will lean against the most forward or rearward of the pins 26 depending whether the motion of the workpiece respective to the saw is forwardly or rearwardly. During the sawing motion, rings 30 roll wheel-like over the workpiece 32 while blade 10 passes through it.

Referring now to Fig. 2, the rings 30 are shown supported on all three of pins 26 in a position concentric with blade 10. If the operator should move his hand from the side against the ring, the ring 30 will prevent him from contacting the saw blade since the ring is supported in its plane by the arcuate channel 36 formed by semi-circular guide plates 24 and the wall of guard 18. It is obvious that guard 18 may be substituted by members similar to the members 24—however, the conventional guard 18 also serves the very important purpose of catching the saw dust and guiding it from the operator. It is further obvious that pins 26 might engage the outer diameter of rings 30 at points below the horizontal diameter of the said rings rather than the inside diameter as shown.

I claim:

1. In a cutting machine having a rotary cutting tool mounted on a normally horizontal rotating arbor, and an arcuate guard mounted about the upper portion of said cutting tool, a pair of spaced substantially semi-circular members mounted about the axis of and spaced one on each side of and from said guard, said spaced members defining a channel on each side of and parallel to said guard, pins securing said members one to each side of said guard in said spaced relationship, and a ring having an outside diameter greater than the diameter of said cutting element and an inside diameter less than the diameter of said cutting element positioned in said channel and loosely supported by said securing pins.

2. A rotary cutting tool having a circular cutting element mounted on a normally horizontal rotating arbor, a guard surrounding the upper and mid-portions of said cutter, a pair of plates mounted one on each side in spaced relation to the sides of said guard and substantially parallel to the plane of said saw blade, pins securing said plates to said guard in said spaced relation, and a pair of rings loosely suspended from said pins and positioned between said plates and said guard, said rings having an external diameter greater than the diameter of said cutting member and an internal diameter less than the diameter of said cutting member whereby said rings serve as a guard around the periphery of said cutting blade and yield to a workpiece engaging said cutting blade at the bottom portion.

3. A guard for a rotary cutter comprising a pair of rings loosely supported and spaced from each side of said cutter in planes parallel thereto, each of said rings having an outside diameter greater than the diameter of said cutter and an inside diameter less than the diameter of said cutter, said rings being normally positioned substantially concentric said rotary cutters, and mounting means loosely engaging each of said rings to maintain said rings in their planes parallel to said saw blades and to permit said rings to move freely in their own planes rotatively and to a limited extent radially.

4. A device as set forth in claim 3, further characterized in that said mounting means comprise spaced plates in planes parallel said cutting tool to define a channel to guide and maintain each of said rings in its plane, and at least two pins in the channel supporting each of said rings, said pins being positioned along a curve substantially concentric said rotary cutter and said pins being spaced from each other and from the axis of said cutter a distance sufficient to support said rings substantially concentric said cutter.

5. A guard for a rotary cutter comprising a ring mounted in spaced relation to the side of said cutter and parallel thereto, said ring having an outside diameter greater than the path traversed by said cutter and an inside diameter less than the path traversed by said cutter, supporting means contacting the inside diameter of said ring to permit free rotational and radial movement of said ring in its own plane, and other means loosely engaging the sides of said ring to prevent axial movement thereof.

6. In a cutting machine having a rotary cutting tool mounted on a normally horizontal rotating arbor, an arcuate guard mounted about an upper portion of said cutting tool, a substantially semi-circular member mounted about the axis of and spaced from said guard, said spaced member defining a channel between said member and said guard, pins securing said member to said guard in said spaced relationship, and a ring having an outside diameter greater than the diameter of said cutting element and an inside diameter less than the diameter of said cutting element positioned in said channel and loosely supported by said securing pins.

7. A guard for a rotary cutter comprising a ring mounted in axially spaced relation to said cutter and parallel thereto, a pair of axially spaced members forming a channel wherein said ring is mounted and at least two pins in said channel and contacting said ring to loosely support it in said channel substantially concentric said cutter so said ring may be moved rotatively relative to said pins and radially from said pins.

References Cited in the file of this patent

UNITED STATES PATENTS

| | | |
|---|---|---|
| 1,152,325 | Lawlor | Aug. 31, 1915 |
| 1,481,569 | Tannewitz | Jan. 22, 1924 |
| 1,576,671 | Meyer | Mar. 16, 1926 |

FOREIGN PATENTS

| | | |
|---|---|---|
| 54,533 | Germany | Nov. 26, 1890 |